Patented Nov. 9, 1948

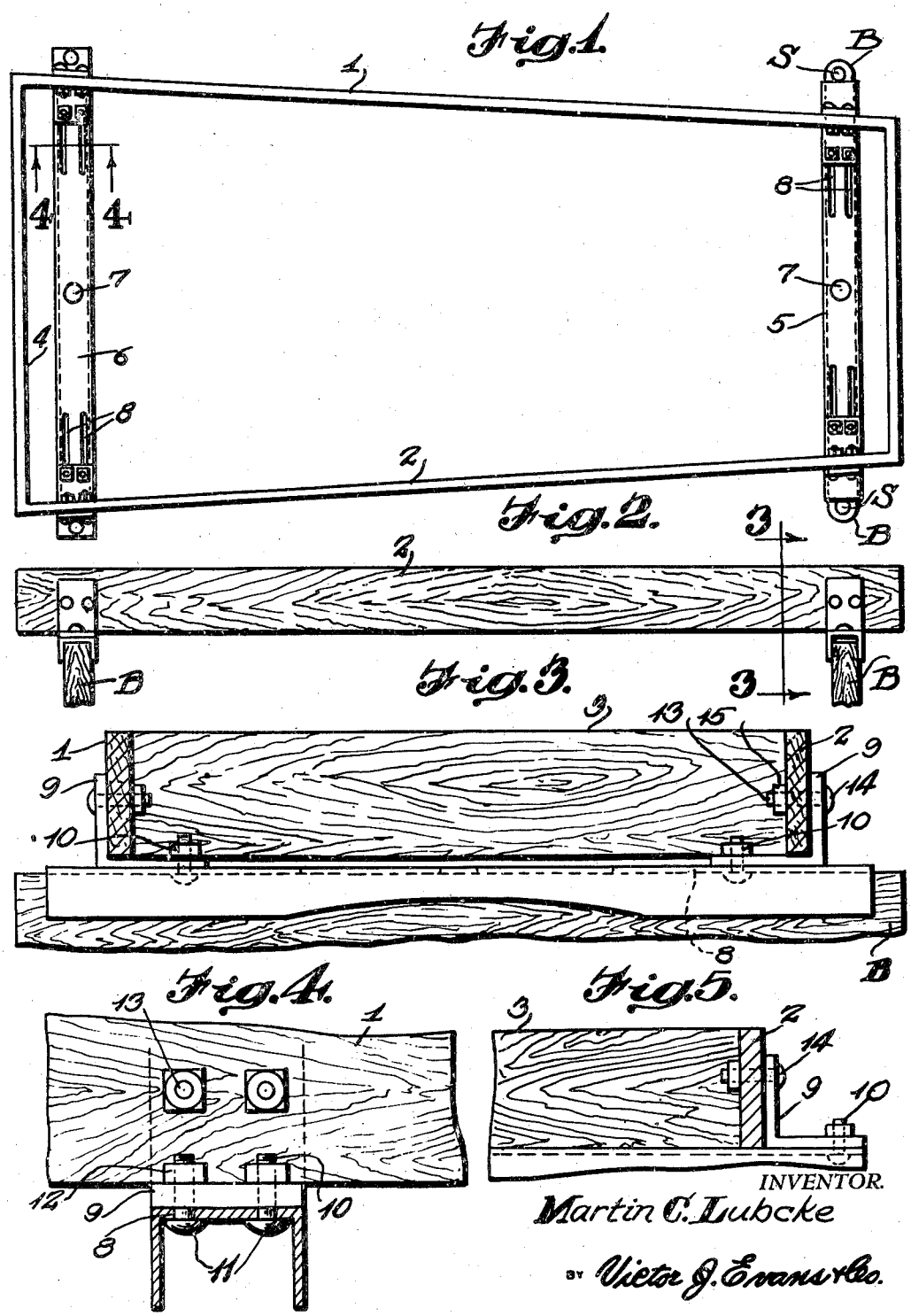

2,453,445

UNITED STATES PATENT OFFICE 2,453,445

ANTISKID VEHICLE FRAME

Martin C. Lubcke, Emmett, Idaho

Application January 28, 1947, Serial No. 724,853

1 Claim. (Cl. 280—143)

My present invention relates to the general class of land vehicles of the wheeled type, and more specifically to an improved anti-skid vehicle frame or load carrier of the type employing attaching beams rigidly mounted upon the front and rear transverse bolsters of wagons, trucks, trailers and other wheeled vehicles to prevent shifting of the loaded rack, bed, frame, or load carrier. The primary object of the invention is the provision of a unitary attachment of this type that may readily be adjusted to fit existing and standard sizes and shapes of vehicles, and which includes interchangeable beams for mounting upon and for use with the conventional front and rear transverse bolsters of vehicles.

By the utilization of my invention I provide an attachment or body frame consisting of a rigid structure which may with facility be manufactured of a minimum number of parts and assembled with equal facility to insure a mechanical structure that may with convenience and ease be mounted upon the bolsters of existing vehicles, as well as upon newly manufactured and standardized frames for various wheeled vehicles.

As here illustrated the invention is embodied in a body frame employing two attaching beams for a four wheel vehicle having front and rear bolsters, but it will be understood that one attaching beam might be employed, or more than two attaching beams may be utilized under varying conditions and circumstances.

The invention consists essentially in certain novel features of construction and combinations and arrangements of parts in a body frame involving the attaching beams, as will be hereinafter described and more specifically set forth in my appended claim.

In the accompanying drawings I have illustrated one example of a physical embodiment of the invention wherein the parts are combined and arranged in a simple and practical manner according to one mode I have devised for the practical application of the principles of the invention. It will, however, be understood that changes and alterations are contemplated and may be made in these exemplifying drawings and mechanical structures, within the scope of my claim, without departing from the principles of the invention.

Figure 1 is a top plan view of a unitary attachment or body-frame, rack, or vehicle bed, in which my invention is physically embodied; and Figure 2 is a view in side elevation of the structure in Fig. 1.

Figure 3 is an enlarged transverse vertical sectional view through the body-frame as at line 3—3 of Fig. 2.

Figure 4 is a further enlarged vertical sectional view transversely of an attaching beam, as indicated at line 4—4 of Fig. 1; and Figure 5 is a vertical sectional detail view showing one of the frame-sills, with a modified arrangement of one of the angle brackets or angle plates.

In order that the general arrangement, utility and relation of parts may readily be understood, I have shown a front and a rear transversely arranged bolster, as B, B of the running gear of a vehicle, which bolsters may be of wood as indicated, or of other suitable material; and the bolsters are equipped with conventional upright stakes or standards S, S, located as usual at the opposite ends of the bolster. The body frame of my invention is mounted upon the bolsters and supported between the oppositely arranged stakes or standards in such manner as to relieve the standards of strains and stresses caused by side-sway of the vehicle.

A conventional body frame, rack, or bed with which my invention is embodied includes two spaced longitudinally extending sills 1 and 2, and front and rear sills 3 and 4, forming a rigid structure of the type having a front that is narrower than the rear end.

The body frame is mounted upon the front and rear bolsters B, B, by interchangeable, inverted, channel beams 5 and 6, of suitable metal, with flanges of suitable size and proper shape to embrace the bolsters, and each beam is provided with a central hole 7 for a king pin or bolt that rigidly secures the beam to the bolster.

The beams, which are of duplicate construction, are equipped with interchangeable and adjustable equipment readily adapting them to transverse bolsters of varying lengths, and the load carrier or frame is rigidly mounted on the bolsters, by means of the beams.

For use in adjusting the equipment, each of the beams, near its opposite ends, is provided with a pair of parallel spaced longitudinally extending slots 8, 8, in its main body portion, and in some instances transversely arranged pairs of bolt-holes may be utilized in lieu of the pairs of slots.

At each end of a beam an angle bracket or angle plate 9 is mounted for co-action with a beam and a sill of the body frame, and by means of an adjusting bolt 10, having a head 11, and passed upwardly through a slot, the angle plate is secured in adjusted position by means of a nut 12. The adjusting bolts 10, 10, are preferably employed in pairs so that the bracket or angle plate may be adjusted toward or away from the end of the beam, and rigidly secured in place by the bolts 10 and nuts 12.

As indicated in Fig. 3, the angle plates are mounted on top of the beams after being slipped under the sills 1 and 2 of the body-frame, and the upright flanges of the angle brackets or plates 9 are located exterior of the sills and attached thereto. For this purpose each bracket is equipped with a pair of supporting bolts 13, 13, passed through holes in the bracket and in the sill, and the bolts, which are provided with heads 14 are securely fastened by means of nuts 15, 15.

In Fig. 5, a modified arrangement of the brackets or angle plates is indicated for use with narrow body frames, the sills rest directly upon the beams, and the brackets are mounted on the beams and sills at the exterior sides of the sills.

From this description taken in connection with my drawings it will be apparent that I have provided a practical body-frame or load support of simple construction, which may be installed for use with convenience and dismounted with equal facility when desirable, which is durable, and efficient in the performance of its required functions.

Having thus fully described my invention, what I claim as new and desire to secure by Letters Patent is:

In a body frame for use with the bolsters of a vehicle, the combination with a frame having a pair of spaced longitudinally extending sills, of a pair of transversely arranged inverted channel beams each having a pair of parallel slots adjacent its ends and mounted upon the bolsters, a pair of interchangeable angle brackets mounted on opposite ends of each beam and located beneath the sills, a pair of bolts passed through the slots at each end of a beam and through an angle plate and nuts for securing said bolts, and a pair of bolts passed through each bracket and through a sill, and locking nuts for the last mentioned bolts.

MARTIN C. LUBCKE.

REFERENCES CITED

The following references are of record in the file of this patent:

UNITED STATES PATENTS

| Number | Name | Date |
|---|---|---|
| 928,288 | Thompson | July 20, 1909 |
| 1,619,288 | Cizek | Mar. 1, 1927 |